United States Patent
Shah et al.

(10) Patent No.: US 11,082,148 B2
(45) Date of Patent: Aug. 3, 2021

(54) METHOD FOR DETECTING ACTIVE RADIOFREQUENCY WIRELESS COMMUNICATION SIGNAL IN A REGION

(71) Applicant: Tata Consultancy Services Limited, Mumbai (IN)

(72) Inventors: Viral Prakash Shah, Thane (IN); Rishi Setiya, Thane (IN)

(73) Assignee: Tata Consultancy Services Limited, Mumbai (IN)

( * ) Notice: Subject to any disclaimer, the term of this patent is extended or adjusted under 35 U.S.C. 154(b) by 250 days.

(21) Appl. No.: 16/285,049

(22) Filed: Feb. 25, 2019

(65) Prior Publication Data

US 2020/0136744 A1  Apr. 30, 2020

(30) Foreign Application Priority Data

Oct. 26, 2018 (IN) .............................. 201821040559

(51) Int. Cl.
*H04B 17/20* (2015.01)
*H04K 3/00* (2006.01)
*H04W 24/08* (2009.01)

(52) U.S. Cl.
CPC .............. *H04K 3/00* (2013.01); *H04W 24/08* (2013.01)

(58) Field of Classification Search
CPC ...... H04K 3/00; H04W 24/08; H04W 64/003; H04W 48/02; H04W 16/14; H04W 24/02;
(Continued)

(56) References Cited

U.S. PATENT DOCUMENTS

| 2009/0016225 A1* | 1/2009 | Laroia | .................. | H04W 16/14 |
| | | | | 370/241 |
| 2012/0100827 A1* | 4/2012 | Bolin | .................... | G08G 1/205 |
| | | | | 455/404.2 |

(Continued)

FOREIGN PATENT DOCUMENTS

WO  WO-2018170267 A1 *  9/2018  ............. G01R 23/16

OTHER PUBLICATIONS

Po, K. et al. (2007). "Signal Detection Method based on Cyclostationarity for Cognitive Radio," *The Institute of Electronics, Information and Communication Engineers*, pp. 1-6.
(Continued)

*Primary Examiner* — Ivan O Latorre
*Assistant Examiner* — Malick A Sohrab
(74) *Attorney, Agent, or Firm* — Finnegan, Henderson, Farabow, Garrett & Dunner, LLP

(57) ABSTRACT

The use of mobile telephones have come into widespread use in such a way that day to day life has become very much dependent on them. This results in unintentional or intentional use of mobile phones in the prohibited areas such as examination centers. A method for detecting active radiofrequency wireless communication signal in a region has been provided. The method involves two stages, calibration stage and mobile phone detection stage. In the calibration stage, the frequency on which the mobile towers in that region are operating are identified. The identified frequency is then used to detect the active wireless RF communication using a plurality of software defined radios (SDR) and the existing client systems present in the region. The method further configured to determine the exact location of the mobile phone from the RF communication signal is generated.

16 Claims, 13 Drawing Sheets

(58) Field of Classification Search
CPC .. H04L 27/0006; H04B 1/0003; H04B 17/382
See application file for complete search history.

(56) References Cited

U.S. PATENT DOCUMENTS

| | | | |
|---|---|---|---|
| 2015/0257156 A1* | 9/2015 | Bose | H04B 17/3913 |
| | | | 455/452.2 |
| 2016/0119752 A1* | 4/2016 | Yerrabommanahalli | |
| | | | H04W 4/023 |
| | | | 455/432.1 |
| 2017/0070975 A1* | 3/2017 | Ranson | H04B 7/15507 |
| 2017/0124361 A1* | 5/2017 | Wilfred | H04L 67/18 |

OTHER PUBLICATIONS

Adrián-Martínez, S. et al. "Acoustic signal detection through the cross-correlation method in experiments with different signal to noise ration and reverberation conditions," *International Conference on Ad-Hoc Networks and Wireless*, Athens, Greece, Jun. 29-Jul. 2, 2015, pp. 66-79.

\* cited by examiner

US 11,082,148 B2

METHOD FOR DETECTING ACTIVE RADIOFREQUENCY WIRELESS COMMUNICATION SIGNAL IN A REGION

PRIORITY CLAIM

This U.S. patent application claims priority under 35 U.S.C. § 119 to: India Application No. 201821040559, filed on Oct. 26, 2018. The entire contents of the aforementioned application are incorporated herein by reference.

TECHNICAL FIELD

The embodiments herein generally relates to the field of mobile phone signal detection. More particularly, but not specifically, the invention provides a method for detecting active radiofrequency (RF) wireless communication in a region.

BACKGROUND

In today's world, mobile telephones or cellphones have come into widespread use. The day to day life has become very much cellphone dependent. At certain places such as examination centers, banking delivery centers, stock market infrastructure, data centers and military areas etc. the usage of mobile phones have been prohibited due to various reasons. In addition to that, at few places cellphones also represent a major security risk. The detection of active communication and avoiding accidents due to radiation in hospital areas, oil pumps, and nuclear plants is also very critical. However, the wide prevalence of mobile phones in everyday life has made enforcement of that prohibition difficult and many unintentional or intentional security breaches or breaking of rules occur on regular basis.

In view of mentioned issue, the research field detection of mobile communication signal in a particular region has gained enough significance. Various technologies and methods are being used for the detection of mobile phone communication. The use of jammer is one of the known method. But the use of jammer blocks entire communication. Radiation level based detectors has also been used. They need to be tuned as per the surrounding, due to which spread spectrum signals cannot be identified with these detectors properly. Thus, RF analysis is conducted to process raw signal for detecting the presence of signal.

Some sniffing techniques have also been used, generally hardware used for sniffing is protocol specific, which makes it difficult to use. Also, general detection completely depends on beacon frames sent by the transmitter. In addition to that the available solutions are not scalable, which makes it difficult to implement them at a larger scale.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

Another embodiment provides a method for detecting active radiofrequency (RF) wireless communication in a region. Initially, the presence of one or more mobile bands present in the region are identified, wherein each of the one or more mobile bands are present in a plurality of mobile signals coming out of a mobile tower in the region. In the next step, downlink frequencies of the one or more mobile bands are divided among a plurality of slots and further distributed in a plurality of software defined radios associated with a plurality of client systems in time division domain, wherein the distribution is performed dynamically depending upon availability of the plurality of client systems by a central server. Further, active channels are detected out of the one or more mobile bands based on the broadcast control channel information (BCCH) transmitted by the mobile tower in the region. In the next step, the information of detected active channels is sent back at the central server. Followed by, the respective uplink channel frequency is calculated for detected active channel from the downlink frequencies. In the next step, the detected active channels are redistributed among the plurality of client systems dynamically in time division domain. Further, a plurality of software defined radios (SDRs) associated with plurality of client systems are tuned to the uplink channel frequencies. In the next step, a raw signal generated from the SDRs is captured in the form of binary data. Later, a cyclic-autocorrelation is performed on the raw signal. In the next step, cyclic-autocorrelated signal is filtered to remove a plurality of noises. Further, a plurality of features are enhanced and extracted in the cyclic-autocorrelated signal. Later, the extracted plurality of features are provided to a support vector machine classifier to classify the presence of the active RF signal. In the next step, a target device signal information is extracted if the active RF signal is detected. And finally the target device signal information is sent to the server.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

In yet another embodiment, one or more non-transitory machine readable information storage mediums comprising one or more instructions is provided. One or more non-transitory machine readable information storage mediums comprising one or more instructions which when executed by one or more hardware processors cause: identifying the presence of one or more mobile bands present in the region, wherein each of the one or more mobile bands are present in a plurality of mobile signals coming out of a mobile tower in the region (202); dividing downlink frequencies of the one or more mobile bands among a plurality of slots and further distribute in a plurality of client systems in time division domain, wherein the distribution is performed dynamically depending upon availability of the plurality of client systems by a central server (204); detecting active channels out of the one or more mobile bands based on the broadcast control channel information (BCCH) transmitted by the mobile tower in the region (206); sending the information of detected active channels back at the central server (208); calculating the respective uplink channel frequency for detected active channel from the downlink frequencies (210); redistributing the detected active channels among the plurality of client systems dynamically in time division domain (212); tuning a plurality of software defined radios (SDRs) associated with plurality of client systems to the uplink channel frequencies (214); capturing a raw signal generated from the SDRs in the form of binary data (216); performing a cyclic-autocorrelation on the raw signal (218); filtering cyclic-autocorrelated signal to remove a plurality of noises (220); enhancing and extracting a plurality of features in the cyclic-autocorrelated signal (222); providing the extracted plurality of features to a support vector machine classifier to classify the presence of the active RF signal (224); extracting a target device signal information if the active RF signal is detected (226); sending the target device signal information to the server (228); the target device signal information and signal source position is calculated from the active RF signal using a triangulation method; comprising the step of determining bandwidth, uplink frequencies and operator information of the plurality of bands; the plurality of features include peak position, standard deviation, slope calculation and ratio calculation; the peak position is derived from the cyclic auto correlated signal and the standard deviation, the slope calculation and the ratio calculation are derived from normal distribution of the cyclic auto correlated signal; the plurality of slots are from one or more of a 2G signal, a 3G signal, a 4G signal or a 5G signal; the blind signal detection method is performed using a cyclic autocorrelation and the plurality of client systems comprise a Launcher application 110, the Launcher application 110 is started before the start of an examination in the region.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
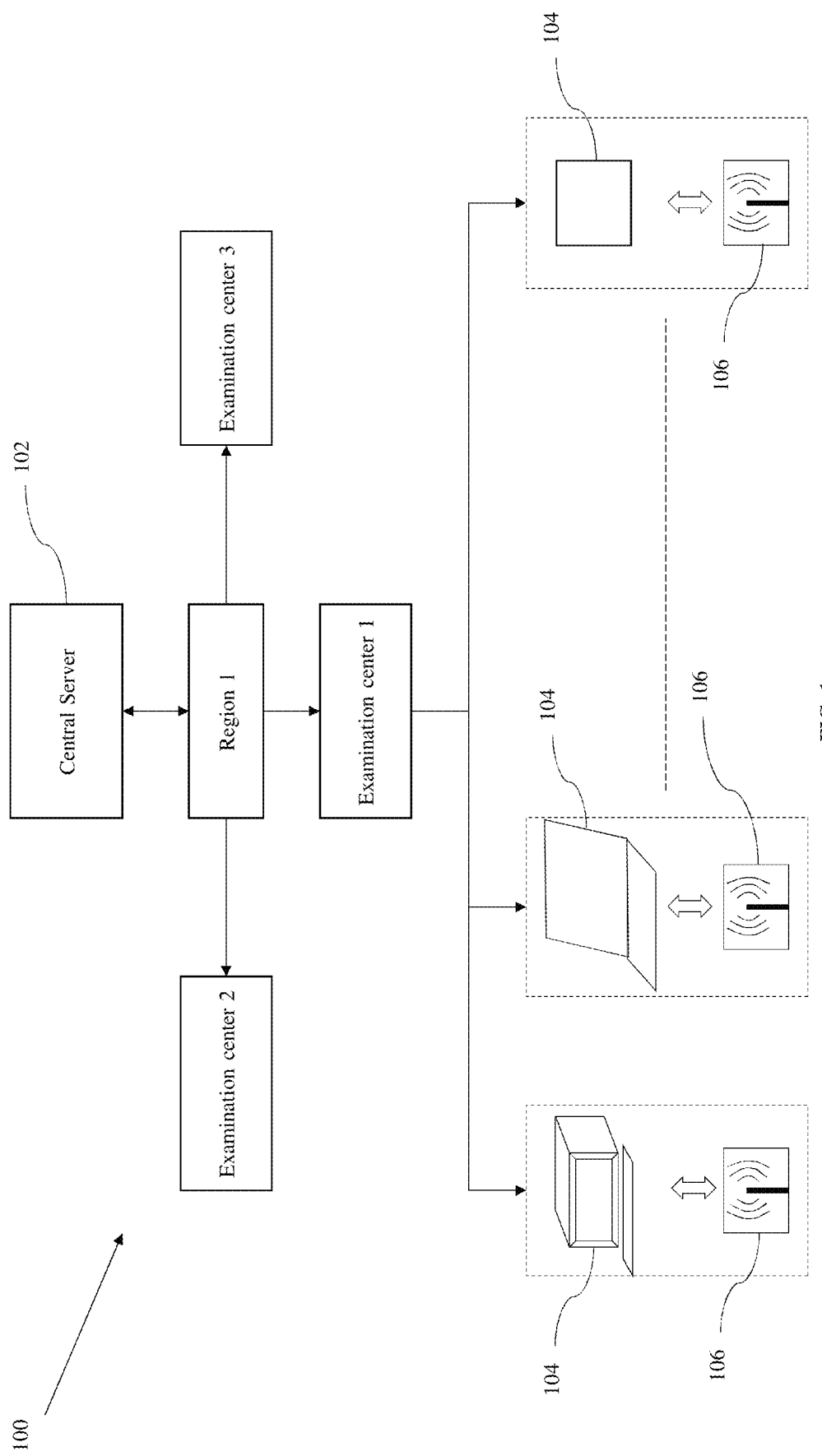
FIG. 1 illustrates an architectural diagram of a system for detecting active radiofrequency (RF) wireless communication in a region according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIG. 1 through FIG. 11, where similar reference characters denote corresponding features consistently throughout the figures, there are shown preferred embodiments and these embodiments are described in the context of the following exemplary system and/or method.

According to an embodiment of the disclosure, a system 100 for detecting active radiofrequency (RF) wireless communication in a region is shown in the architectural diagram of FIG. 1. The system 100 is a set-up which can be implemented in the region to detect the RF wireless communication. The disclosure provides a method for detecting any RF communication generating from a mobile phone. In addition to that the method can also detect the mobile phone from which the RF wireless communication is generated.

The present invention have been described in a setup of examination center, where this method and system 100 can be used to detect the unlawful use of mobile phone in the examination center to avoid cheating. As shown in FIG. 1, there could be more than one examination center in the region. A separate setup can be implemented in each of the examination center.

According to an embodiment of the disclosure, the system 100 comprises a central server 102. The central server 102 may be a cloud based server 102. The central server 102 is connected with more than one regions. In the example of FIG. 1, the central server 102 is connected with the region 1. The system 100 is making use of a plurality of client systems 104 present in the examination center. The plurality of client systems 104 may be a laptop, computer or any other processing device.

The method of detection of the radiofrequency (RF) wireless communication can be divided into two stages, a calibration stage and a mobile phone detection stage. The aim of the calibration stage is to identify the frequency on which mobile towers in that region are operating. The mobile phone detection stage is for the detection of the mobile phone communicating the RF wireless signal using the identified frequency in the previous stage. Before the start of the examination, the calibration operation is performed in order to collect details of active frequency channels. Each exam center will run a Lanscape application 108 over each of the plurality of client systems 104 connected to it. Each of the plurality client system 104 will be having a Launcher application 110 in order to communicate with the Lanscape application 108 and running scan for slot provided by the Lanscape application 108. The detailed operation of the Lanscape application 108 and the Launcher application 110 have been explained in the later part of the disclosure below.

According to an embodiment of the disclosure, the system 100 is also using a plurality of software defined radios (SDR) 106 as shown in FIG. 1. The SDR is used for the detection purpose and will divide targeted bands to be scanned into multiple slots so that these slots can be distributed among available plurality of client systems 104 for scanning. Generally, hardware used for sniffing is protocol specific, thus SDR is used to implement various software protocol stack over raw signal.

Software defined radio (SDR) is used in order to detect radio frequency Signals. SDR is tuned to the set of frequencies over which signal is likely to be present. Digital data signal is recovered from RF Signal. Target protocol and type of communication to be detected is decided and software stacks are implemented for the same. Encoding in case of transmitting whereas decoding in case receiving is performed in order to extract digital data depending upon protocol used. Dedicated hardware (either SDR or protocol specific hardware) can be used for various protocols on the other hand various software protocol stack can be implemented on single hardware simultaneously as long as signals are present within reception bandwidth (e.g. BT, Wi-Fi and RF Simultaneous Detection). Doing so provides advantage of covering multiple channels simultaneously. For example in case of 2.4 GHz Wi-Fi, there are 14 channels (from 2.412 GHz to 2.484 GHz) are present on various adjacent frequencies with OFDM modulation scheme. During communication, service provider and clients tends to stick with one of the channel. WiFi MAC addresses can easily extracted upon packet sniffing over various channels. Occasional active sniffing is performed by manipulating any client to respond to fake request sent by sniffer.

Figure 3A:
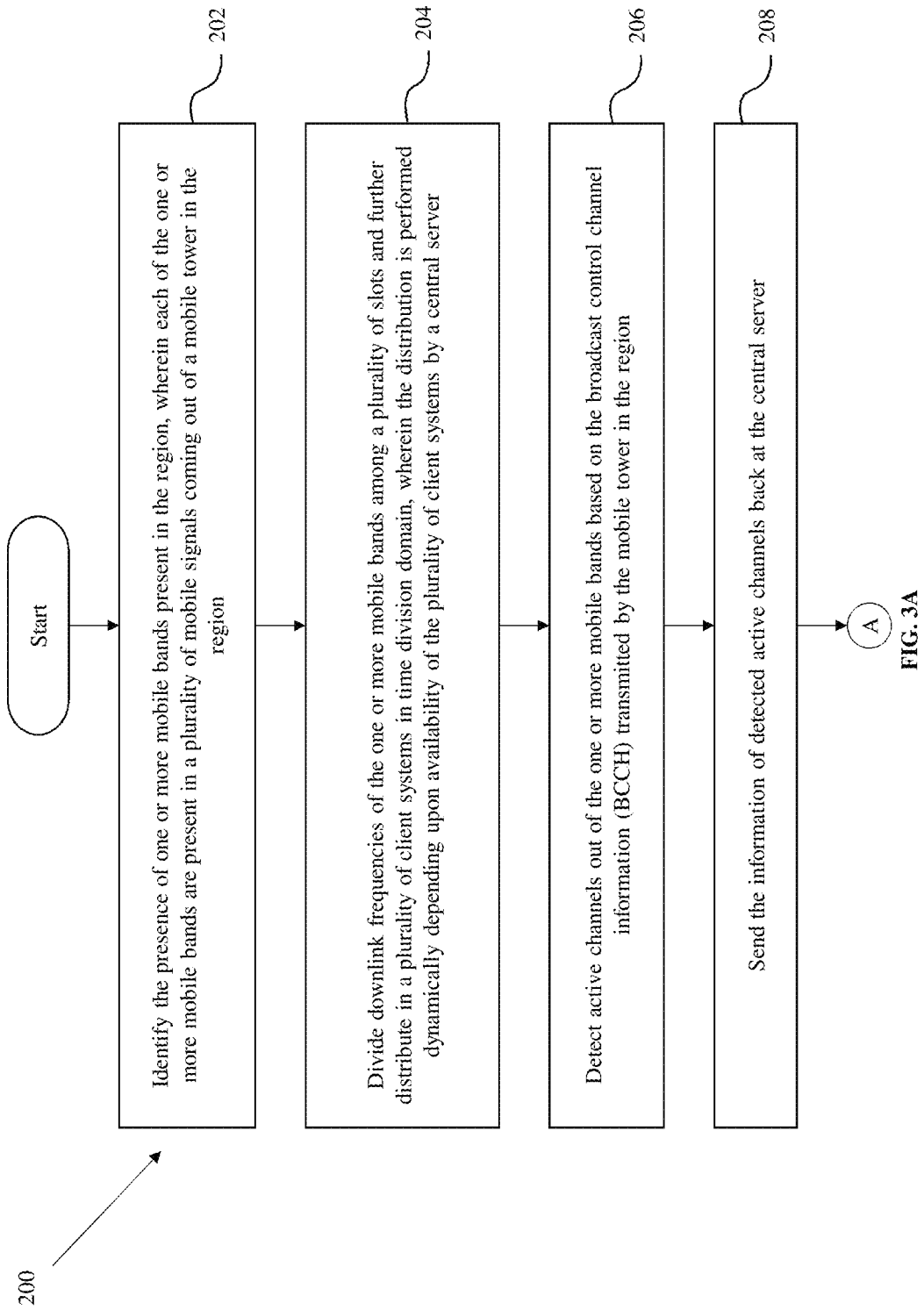
FIG. 3A through 3C is flowchart illustrating steps involved in detecting active radiofrequency (RF) wireless communication in a region according to an embodiment of the present disclosure.
Figure 3B:
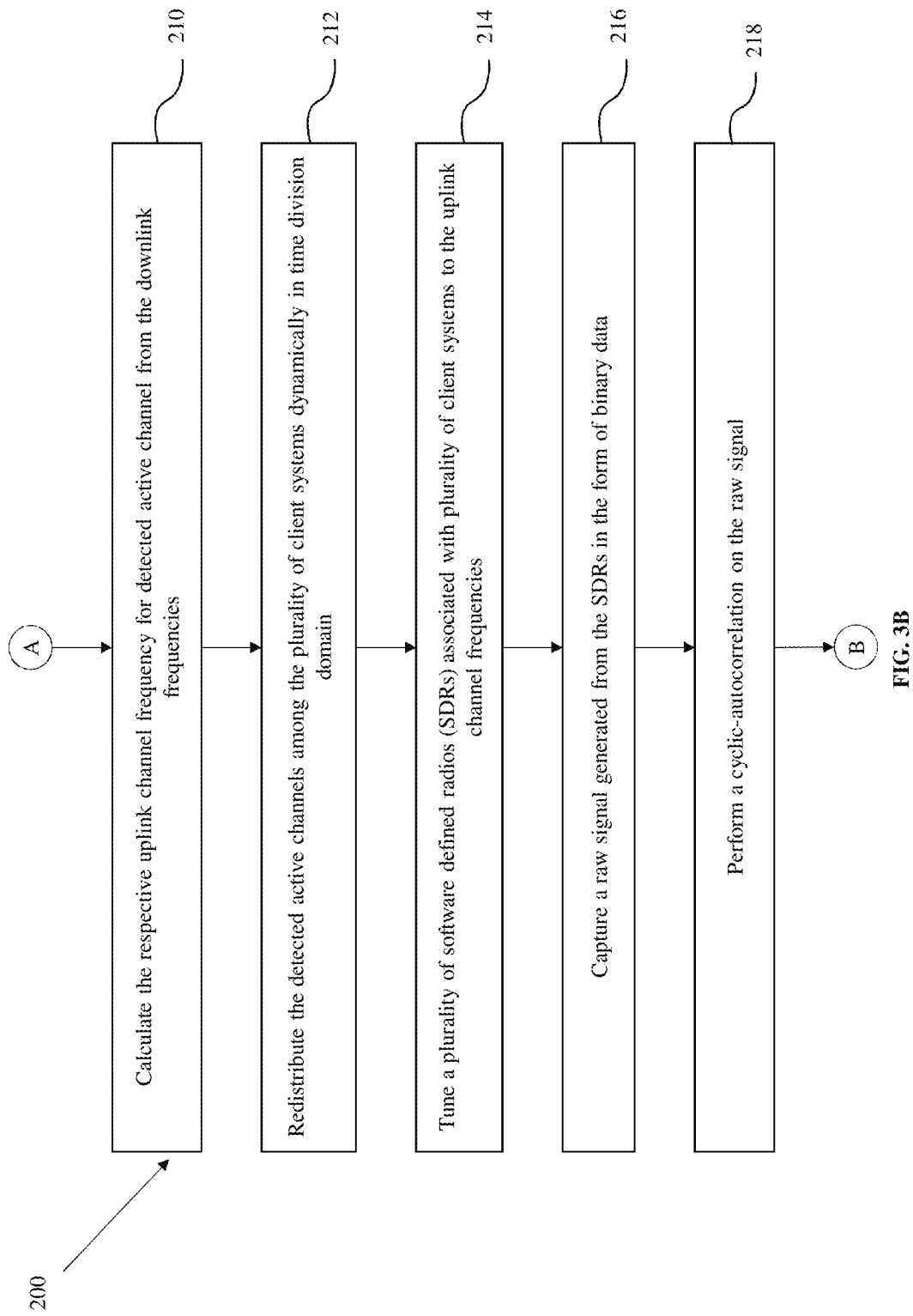
Figure 3C:
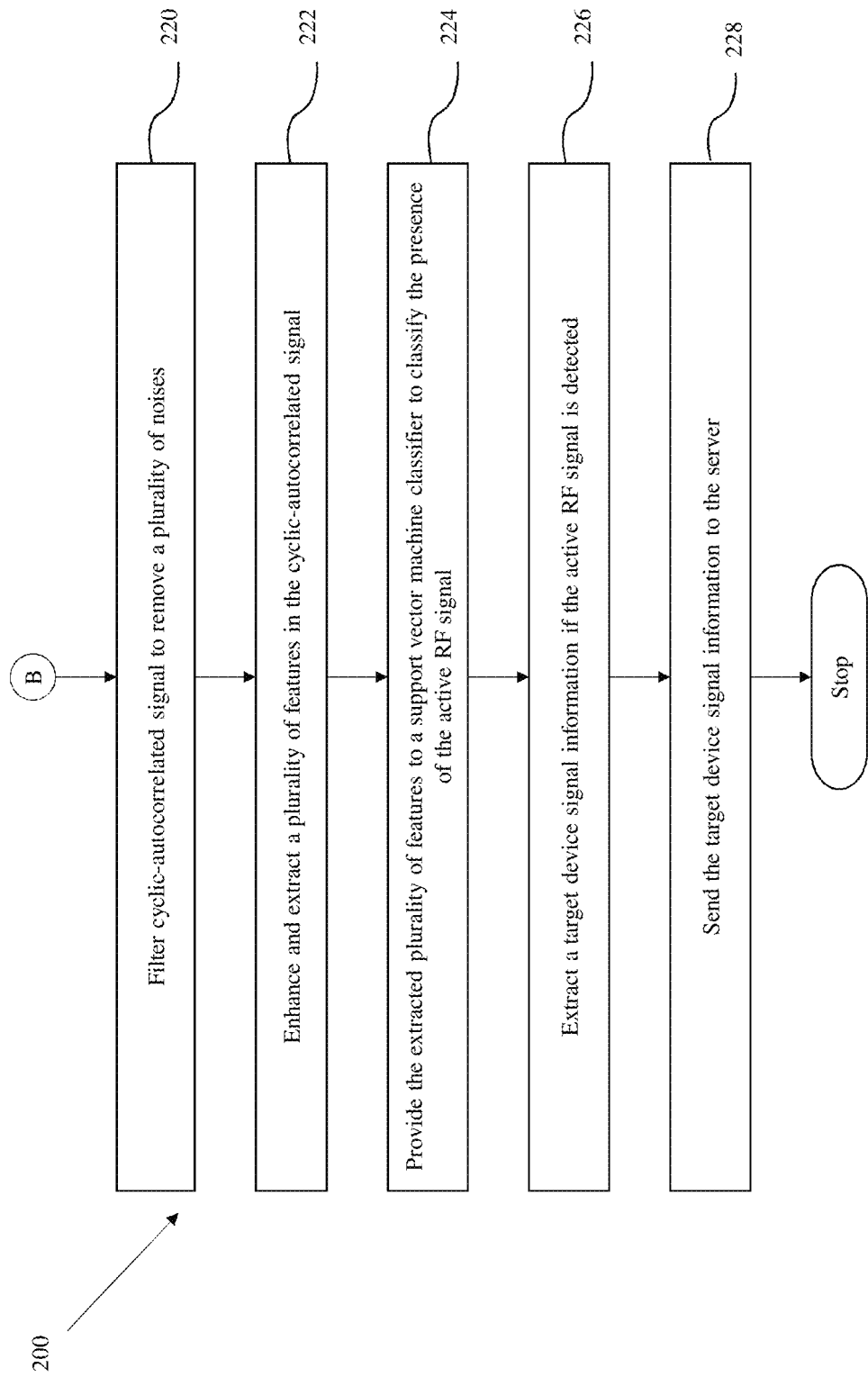

In operation, a flowchart 200 illustrating a method for detecting active radiofrequency (RF) wireless communication in the region is shown in FIG. 3A through 3C. Initially at step 202, the presence of one or more mobile bands present in the region is identified. Each of the one or more mobile bands are present in the plurality of mobile signals coming out of a mobile tower in the region. Each of the mobile bands have their downlink frequencies. At step 204, the downlink frequencies of the one or more mobile bands are divided among a plurality of slots and further distributed among the plurality of client systems 104 in time division domain. The plurality of client systems 104 are nothing but the computers and laptops present at the examination centers. The distribution is performed dynamically by the central server 102 depending upon availability of the plurality of client systems 104.

In the next step 206, active channels are detected out of the one or more mobile bands based on the broadcast control channel information (BCCH) transmitted by the mobile tower in the region. Each mobile service provider have only few active channels in each 2G, 3G and 4G signals. The mobile signal includes lot of inactive channels which are of no use for the method of detection. At step 208, the information of detected active channels is sent back to the central server 102. In the next step 210, a respective uplink channel frequency is calculated for the detected active channels using the downlink frequencies. The formula for calculating up-link frequency from down-link frequency is as follow in Equation 1:

Center of uplink frequency (MHz)=Center of downlink frequency (MHz)−gap (MHz) (1)

Uplink frequency will be available over (Center of uplink frequency)+/−(Bandwidth/2). The gap table is shown below in Table 1

TABLE 1

| Sr. no. | Type | Band | Bandwidth (MHz) | Gap (MHz) |
|---|---|---|---|---|
| 1 | 2G | GSM900 | 0.2 | 45 |
| 2 | 2G | EGSM | 0.2 | 45 |
| 3 | 2G | DCS | 0.2 | 95 |

TABLE 1-continued

| Sr. no. | Type | Band | Bandwidth (MHz) | Gap (MHz) |
|---|---|---|---|---|
| 4 | 3G | Band 1 | 1 | 45 |
| 5 | 3G | Band 8 | 5 | 190 |
| 6 | 4G | Band 3 | 5 | 95 |
| 7 | 4G | Band 5 | 5 | 45 |
| 8 | 4G | Band 40 | 20 | 0 |

In the next step 212, the detected active channels are redistributed among the plurality of client systems 104 dynamically in time division domain. Up to this step is the calibration stage of the method of detection of RF wireless communication.

Figure 2:
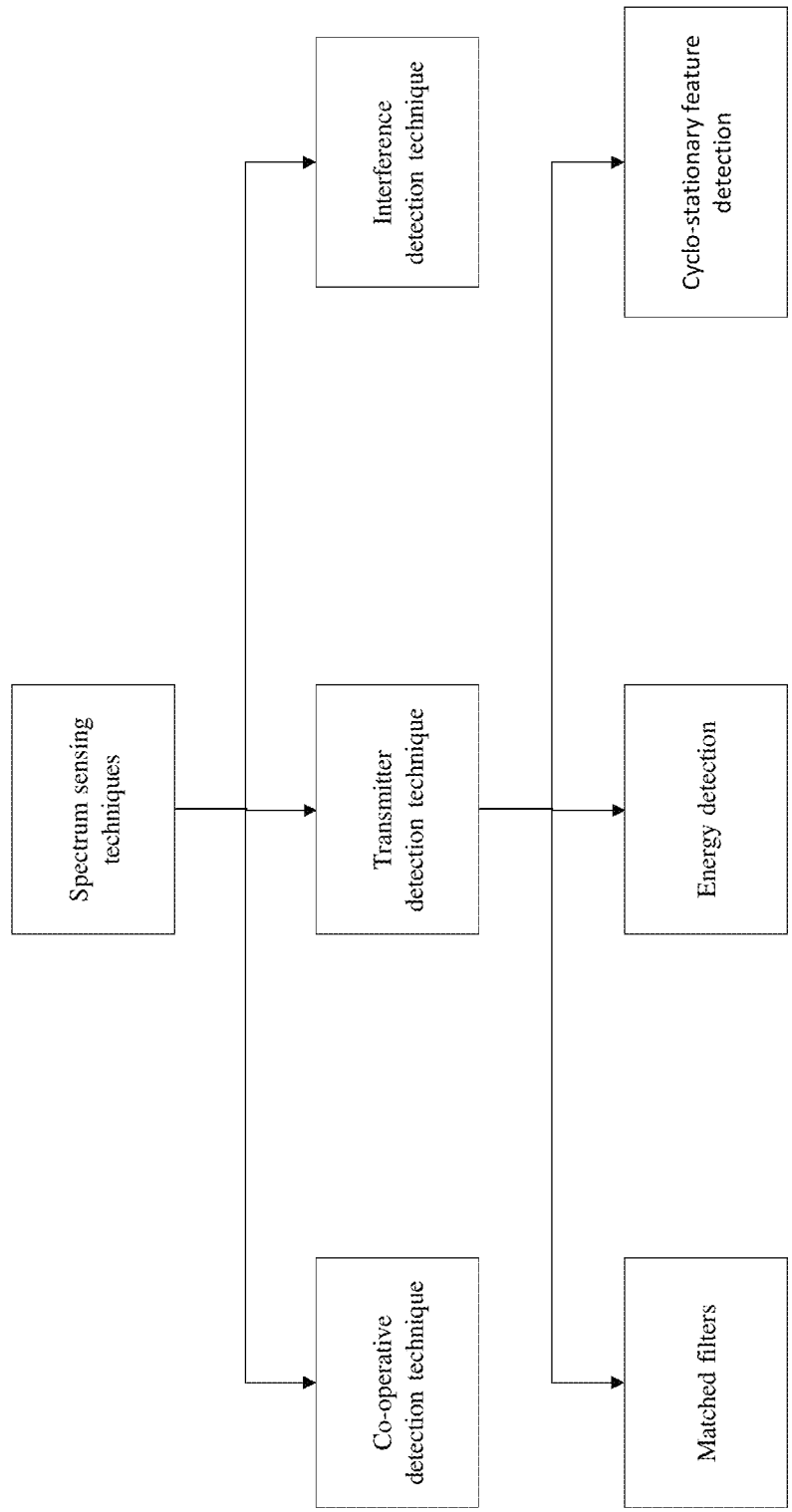
FIG. 2 shows various approaches used for detecting active radiofrequency (RF) wireless communication according to an embodiment of the disclosure.

In the next step 214, the plurality of software defined radios (SDRs) 106 associated with plurality of client systems are tuned to the calculated uplink channel frequencies. In the next step 216, a raw signal generated from the SDRs is captured in the form of binary data. Many signals used in communication systems exhibits periodicities of their second order statistical parameters due to the operations such as sampling, modulating, multiplexing and coding. These cyclo-stationary properties, which are named spectral correlation features can be used for spectrum sensing. The FIG. 2 shows various approaches for signal detection purpose. In the present embodiment, the detection is based on transmitter detection technique. The transmitter detection technique is based on detection of weak signal from a primary transmitter. Matched filter approach requires prior knowledge of channel or signal to be identified. Unknown input signal is correlated with known signal to detect degree of match. Energy detection technique calculates amount of power within channel for detection purpose. The cyclo-stationary feature detection approach uses signal periodicity properties, it requires little signaling overhead and lesser signal observation time. Thus, cyclo-stationary feature detection technique was used.

In the next step 218, a cyclic-autocorrelation is performed on the raw signal. The autocorrelation is either a periodic function or an almost periodic function. In either case, it can be represented by a Fourier series using Equation (2):

$$R_x(t,\tau) = \Sigma_x{}^\alpha(\tau) e^{j2\pi\alpha t} \quad (2)$$

where $R_x{}^\alpha(\tau)$ is a Fourier-series coefficient called the cyclic autocorrelation function. The Fourier frequencies $\alpha$ are called cycle frequencies (CFs). The CAFs are obtained in the usual way for Fourier coefficients as shown in equation (3)

$$R_x^\alpha(\tau) = \lim_{T\to\infty} \frac{1}{T} \int_{-T/2}^{T/2} Rx(t,\tau) e^{-j2\pi\alpha t} \quad (3)$$

Further, the cyclic autocorrelation can be performed using equation (4)

$$\lim_{T\to\infty} 1/T \int_{-T/2}^{T/2} x\left(t+\frac{\tau}{2}\right) x*\left(t-\frac{\tau}{2}\right) e^{-j2\pi\alpha t} dt = \quad (4)$$

$$\left\langle x\left(t+\frac{\tau}{2}\right) x*\left(t-\frac{\tau}{2}\right) e - j2\pi\alpha t\right\rangle$$

where T is a lag parameter, $$\left(t+\frac{\tau}{2}\right) \text{ and } \left(t-\frac{\tau}{2}\right)$$

are two time instances, x(t) is a complex valued signal defined on a suitable probability space, Further, Spectral Correlation is obtained by taking Fourier transform of cyclic autocorrelation as shown in equation (5):

$$S_x^\alpha(f) = \int_{-\infty}^{+\infty} R_x^\alpha(\tau) e^{-j2\pi f\tau} d\tau \qquad (5)$$

$$= \int_{-\infty}^{+\infty} \lim_{T\to\infty} \frac{1}{T} \int_{-T/2}^{T/2} x\left(t+\frac{\tau}{2}\right) x*\left(t-\frac{\tau}{2}\right) e^{-j2\pi\alpha t} e^{-j2\pi\alpha f\tau} dt d\tau$$

$$= \lim_{T\to+\infty} S_{xT}^\alpha(t,f)$$

The autocorrelation function is the correlation between the random variables corresponding to two time instants of the random signal. At step 220, cyclic-autocorrelated signal is filtered to remove a plurality of noises. The cyclic autocorrelation is calculated for different size with different cyclic lag for different signals, different filters are used for different types of signal based on convenience of feature extraction. The different types of filters and their effect have been explained in the later part of the disclosure.

At step 222, a plurality of features are enhanced and extracted from the cyclic-autocorrelated signal. The plurality of features include a peak position, a standard deviation, a slope calculation and a ratio calculation. The peak position is derived from the cyclic auto correlated signal and the standard deviation, the slope calculation and the ratio calculation are derived from normal distribution of the cyclic auto correlated signal. The plurality of features are extracted as follows:

Peak Position: The filtered cyclic-autocorrelated signal is normalized. As the cyclo-stationary signal contains periodicity peaks, it will appear depending upon either frame duration, pilot signal position or any synchronizing technique implemented in the cyclic-autocorrelated signal. Spacing and positioning of these signal are unique and very important feature in blind signal analysis. Two main factors are considered while calculating peaks namely, threshold and minimum distance between adjacent peaks.

Standard Deviation ($\sigma$): Standard deviation is the measure that is used to quantify the amount of variation or dispersion of a set of data values. A low standard deviation indicates that the data points tend to be close to the mean (also called the expected value) of the set, while a high standard deviation indicates that the data points are spread out over a wider range of values. Formula for calculating Standard Deviation is as follow in Equation (5):

$$s = \sqrt{\frac{\sum_{i=1}^{N}(xi-x')2}{N-1}} \qquad (5)$$

Normal Distribution (i.e. Histogram) of the cyclic-autocorrelated signal is calculated. As shown in the FIG. 7, rest of the features are mainly based on the normal distribution only. When no signal is present, there will not be any peaks in the correlation graph due to lack of periodicity. It will show almost straight horizontal line with slight distortion due to noise. Normal distribution will be heavily concentrated around mean value and will have narrow size. When cyclo-stationary signal are detected peaks will be generated in correlation and will have wide distribution in normal distribution graph as shown in plot for 2G above. This is due to large variation in value of data points Thus more the standard deviation higher the probability of presence of peaks Slope Calculation: As mentioned above, wider the normal distribution more is the variation among data points. The data points that mainly contribute to the peak points are lower in number and will be on edge (far away from mean value) of normal distribution. As per the normal distribution graph shown in FIG. 7, point (x1, y1) is the point with maximum occurrence thus it must be approximate mean value. The point B (x2, y2) is the point with less occurrence and present on edge of normal distribution thus it must be contributing for peaks (This point belongs to highest peak). In order to detect narrow shape peaks and avoid spread distribution due to either random Gaussian noise or square waves slope of the green line joining point (x1,y1) and (x2,y2) is calculated using equation (6).

$$m = \frac{y2-y1}{x2-x1} \qquad (6)$$

Figure 7:
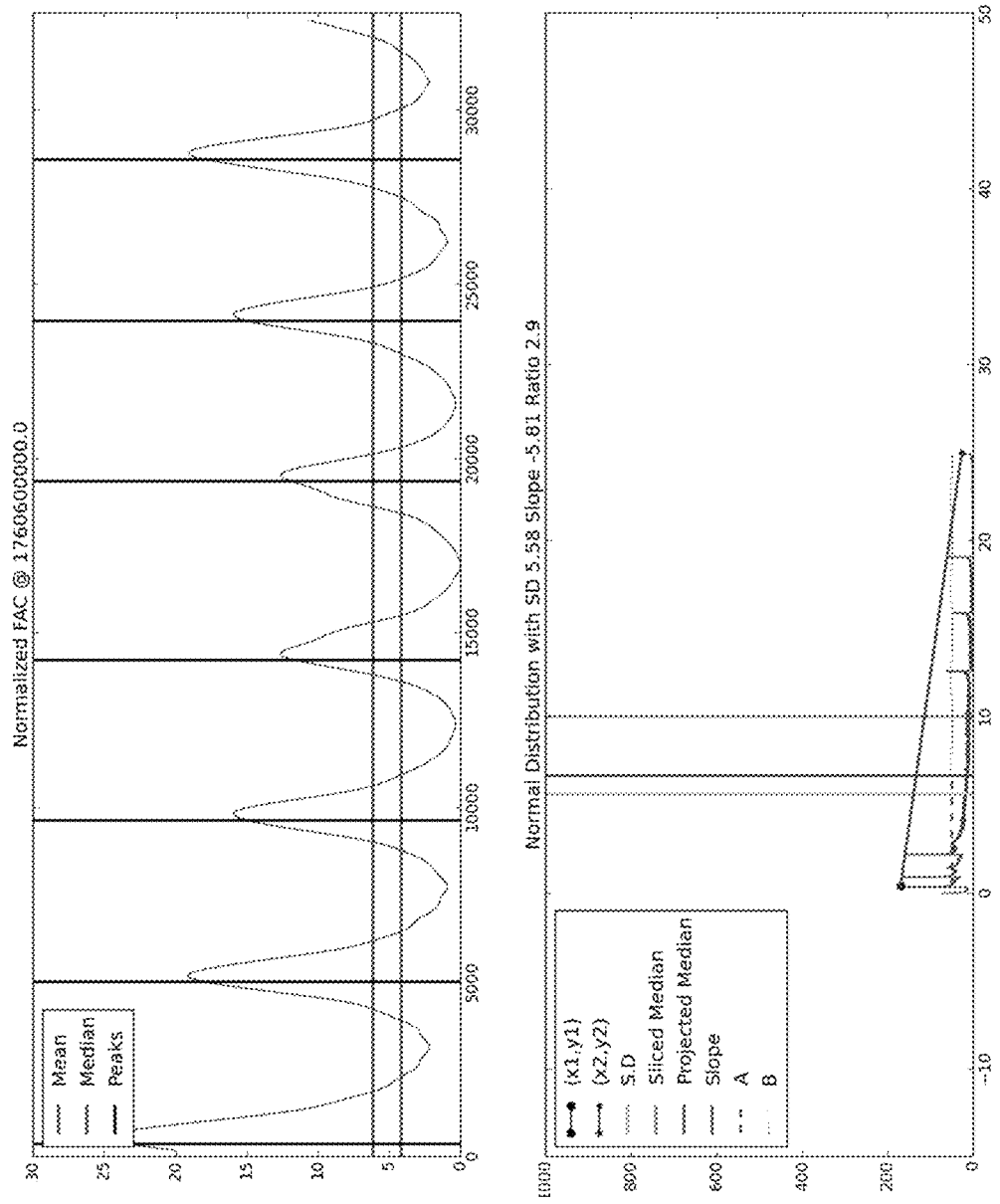
FIG. 7 shows a graphical representation of filtered 2G signal according to an embodiment of the disclosure.

Ratio Calculation: In order to uniquely identify characteristics of narrow shaped peaks, ratio is calculated. In this procedure, only positive half part (0 is considered at max point i.e. point (x1, y1)) of normal distribution (keys: on x-axis, weights: on y-axis) is considered. Median value is calculated for distributed weight. Now calculating position of sliced median in weight distribution respective key is calculated. This projected median divides sliced positive distribution into two parts, part A is from point (x1,y1) to projected median whereas part B is from projected median to point (x2,y2) as shown in FIG. 7. Calculating this ratio helps us in finding degree of narrowness depending upon ratio of points contributing peaks to points contributing near mean as provided in equation (7).

Ratio=(x2−projected_median)/(projected_median−x1) (7)

In the next step 224, the extracted plurality of features are provided to a support vector machine classifier to classify the presence of the active RF signal. In an example, a binary classifier can be implemented for each type of signal over respective frequency band to find whether signal is present or not. At the next step 226, a target device signal information is extracted if the active RF signal is detected. And finally at step 228, the target device signal information is sent to the server.

According to an embodiment of the disclosure, the system 100 can also be explained with the help of examples. The details of 2G, 3G and 4G operational bands in India and how they will be divided during scanning is shown in Table 2.

TABLE 2

| Sr. no. | Type | Band | Operating Frequency Range (MHz) | No. of Slots | Approx. Time Req./Slot (Sec.) |
|---|---|---|---|---|---|
| 1 | 2G | GSM900 | 925.0-960.0 | 1 | 90 |
| 2 | 2G | EGSM | 925.0-960.0 | 1 | 120 |
| 3 | 2G | DCS | 1805.0-1879.2 | 1 | 240 |

TABLE 2-continued

| Sr. no. | Type | Band | Operating Frequency Range (MHz) | No. of Slots | Approx. Time Req./Slot (Sec.) |
|---|---|---|---|---|---|
| 4 | 3G | Band 1 | 925.7-960.7 | 13 | 30 |
| 5 | 3G | Band 8 | 2112.5-2172.5 | 36 | 30 |
| 6 | 4G | Band 3 | 1804.0-1818.0 | 8 | 90 |
| 7 | 4G | Band 5 | 868.0-888.0 | 11 | 90 |
| 8 | 4G | Band 40 | 2300.0-2405.0 | 22 | 90 |

According to Table 1, overall 93 slots are available and the total time required for complete scanning is one and half hour (93.5 minutes). Operating frequencies mentioned in the Table 1 are down-link frequency range for various channels. Detecting active down-link frequencies will help in calculating respective up-link channels where mobile phone communication can be detected in second stage of workflow.

Figure 4:
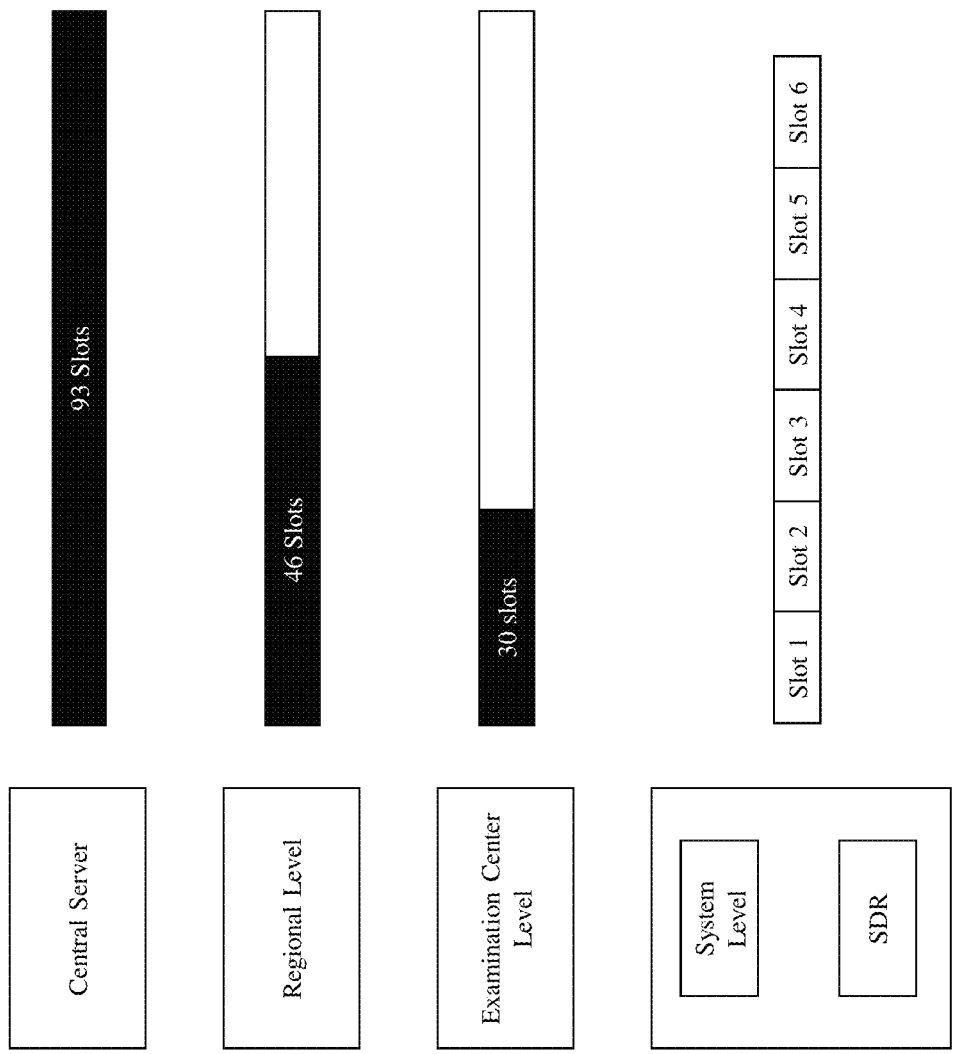
FIG. 4 shows schematic distribution of a plurality of slots according to an embodiment of the disclosure.

The central server will be having collection of these 93 slots. Most of the time, spectrum allocation details for specific region are provided by government of India on 'Telecom Regulatory Authority of India' website. Now the slots to be scanned can reduced up-to 46 as shown in FIG. 4. Same information can further be used to narrow down number of slots to 30 depending upon location of the examination center. Now consider if at least 5 systems are available with Software Defined Radio for scanning, 6 slots per system can be distributed. Even if slots could be continuous, it is not possible to cover all slots simultaneously as it will require huge processing power. Thus, the system will hop over these 6 slots one by one over time. Note that if frequency allocation details are not available properly, then all 93 slots would have to be distributed among these 5 systems which will take more time as compared to the solution provided in the present disclosure. The similar structure is used in second stage for mobile phone detection in active up-link frequency slots. This method of load distribution allows to cover maximum amount of spectrum simultaneously with minimum processing power per system.

Figure 5:
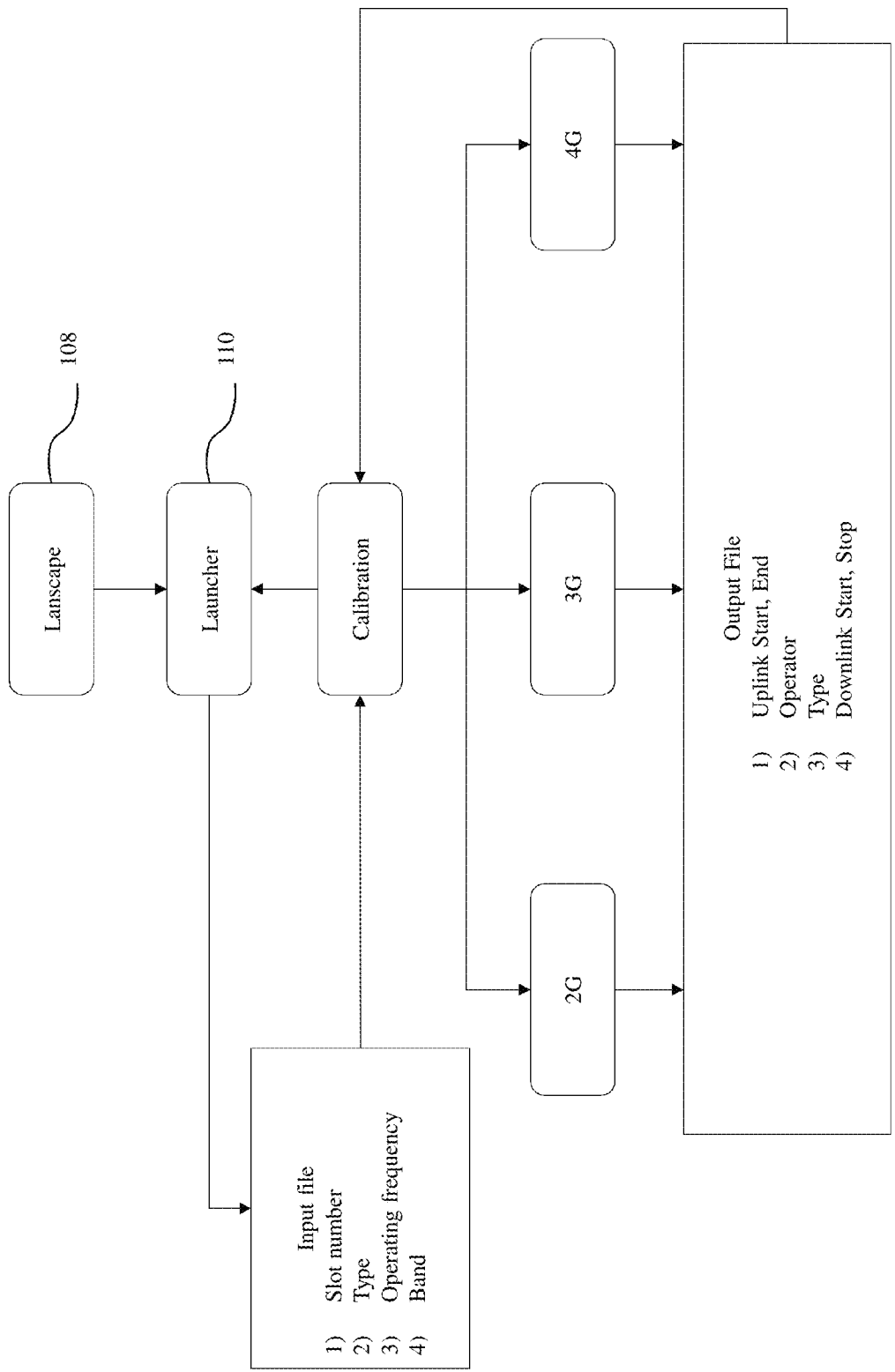
FIG. 5 shows a calibration flow diagram of the system according to an embodiment of the disclosure.

According to an embodiment of the disclosure, each of the plurality of client systems 104 comprises the Lanscape application 108 and the Launcher application 110 as shown in the flow diagram of FIG. 5. The Lanscape application 108 and the Launcher application 110 help in the calibration stage as follows:

Lanscape application 108 will already have spectrum divided into slots and it will be responsible for distributing the slots to the plurality of client systems. The Lanscape application 108 will also be knowing systems to which SDR is connected. First of all, the Lanscape application 108 will start the Launcher application 110 running on individual system. This will allow the Launcher application 110 to activate calibration program in it. Now, the Lanscape application 108 will start sending slots one by one to the Launcher application 110 running calibration application. Further, the calibration application has system level dependency and cannot be completely packaged into the Launcher application 110. But static calibration program files are present in the Launcher application 110 so that this program can be modified just by updating the Launcher application 110. The Launcher application 110 will invoke calibration program as if it is the system application and thus intercommunication between them will be through external files, i.e. an input file and an output file. In the next step, the Lanscape application 108 will provide instruction to the Launcher application 110 which will pass it to the calibration application by writing it into file.

In the next step, the calibration application will analyze the previous instruction and scan the requested frequency using one of the algorithms. Calibration application will take time mentioned in above table for completing scanning over given slot. The calibration application will write response in the output file. The Launcher application 110 will read the response and forward it to the Lanscape application 108 depending upon status field. The status field will be "Positive" on successful scanning with tower detection, "Negative" on successful scanning but tower not detected and "Invalid" in case timed out or program crashed. In case of "Invalid" status the Launcher application 110 will kill all instances and then restart the calibration application.

In the next step, the Lanscape application 108 will create map the complete spectrum, which will be further used for sniffing mobile phones. And finally, after completing all the slots the Lanscape application 108 will send instruction to stop all the Launcher application 110s which will kill calibration instance on that system.

According to an embodiment of the disclosure, the Lanscape application 108 and the Launcher application 110 also help in mobile phone detection stage as follows:

In this stage, the examination center will conduct exam through the Launcher application 110 on all systems and in the background it provide slots to be scanned for mobile phone communication detection. These slots will be nothing but available channels within that are for mobile communication. First of all the exam center will provide sniffing instruction to the Launcher application 110 running on individual system. This will allow the Launcher application 110 to activate sniffing program in it. Now the examination center will start sending slots for active up-link frequencies to the Launcher application 110 running the sniffing application. The sniffing application has system level dependency and cannot be completely packaged into the Launcher application 110. But static sniffing program files are present in the Launcher application 110 so that this program can be modified just by updating the Launcher application 110. The Launcher application 110 will invoke sniffing program as if it is system application and provide slot details during the same.

In the next step, the sniffing application will analyze slots provided by the examination center and scan the requested frequency using one of the algorithms. Program is designed to stay on single slot for at least 15 seconds. Further, the sniffing application will write response in a sniffing file. The Launcher application 110 will read the response and forward it to the examination center. After completing exams, the examination center will send instruction for stopping the sniffing to all the Launcher application 110s which will kill sniffing instance on that system.

Finally, the examination center will collect response from all the systems connected to it and inform respective authorities on detecting any wireless communication.

According to an embodiment of the disclosure, the Wi-Fi and Bluetooth Sniffing can also be implemented in the similar fashion by a person having ordinary skill in the art.

According to an embodiment of the disclosure, the system 100 can use different type of filters depending on the type of the signal. Before extracting features from cyclically autocorrelated signal, Filter is used for easy feature detection and avoidance of noise in the signal properties.

Figure 6:
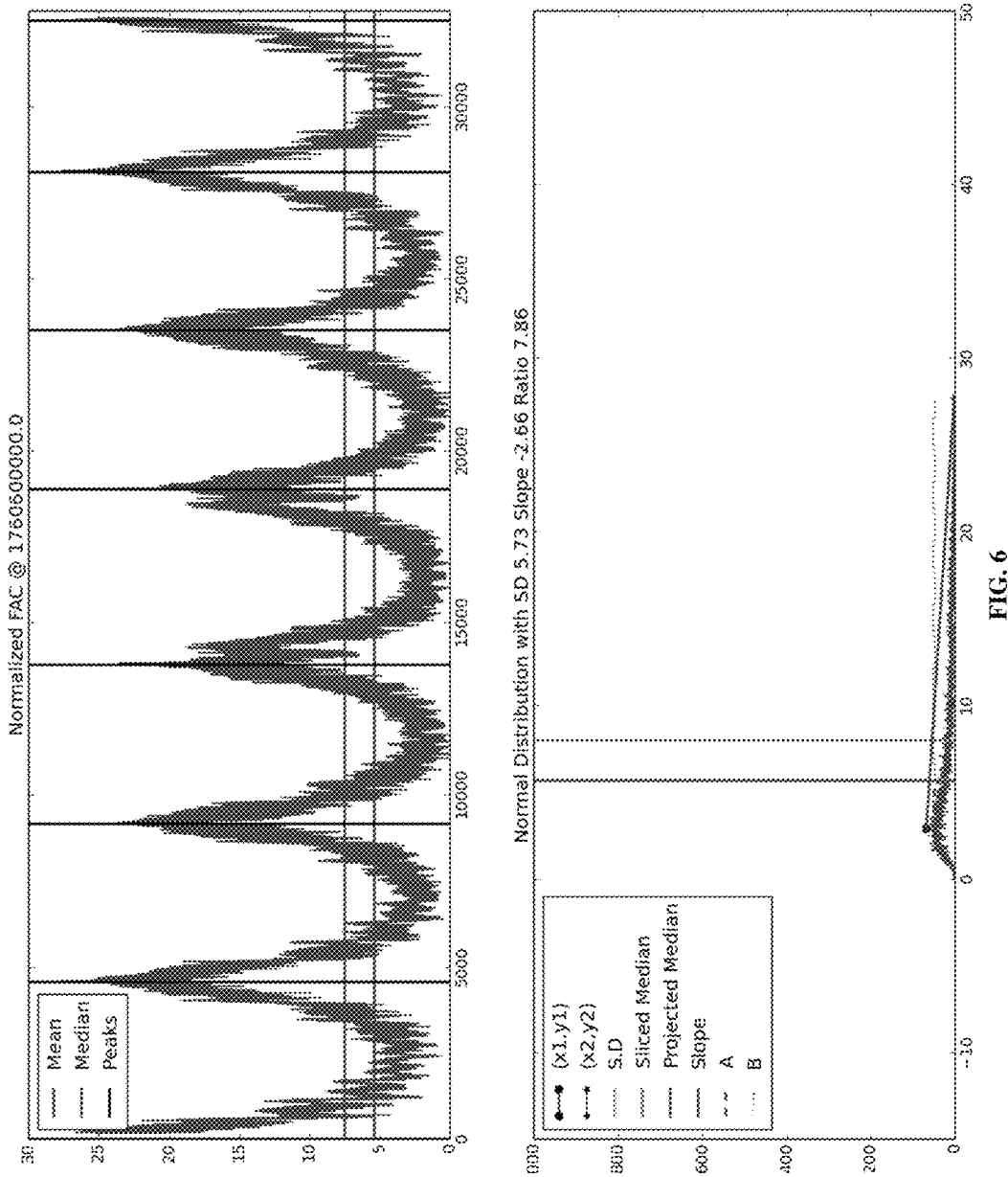
FIG. 6 shows a graphical representation of unfiltered 2G signal according to an embodiment of the disclosure.

For example, the unfiltered 2G Signal at frequency 1760.6 MHz shown in FIG. 6. As shown in graph the 2G signal is very much distorted and thus normal distribution and features are heavily affected by it. Now after passing 2G signal through a low pass filter and removing noise, better and much suitable data points can be obtained for feature extraction. A filtered 2G signal is shown in FIG. 7.

Figure 8:
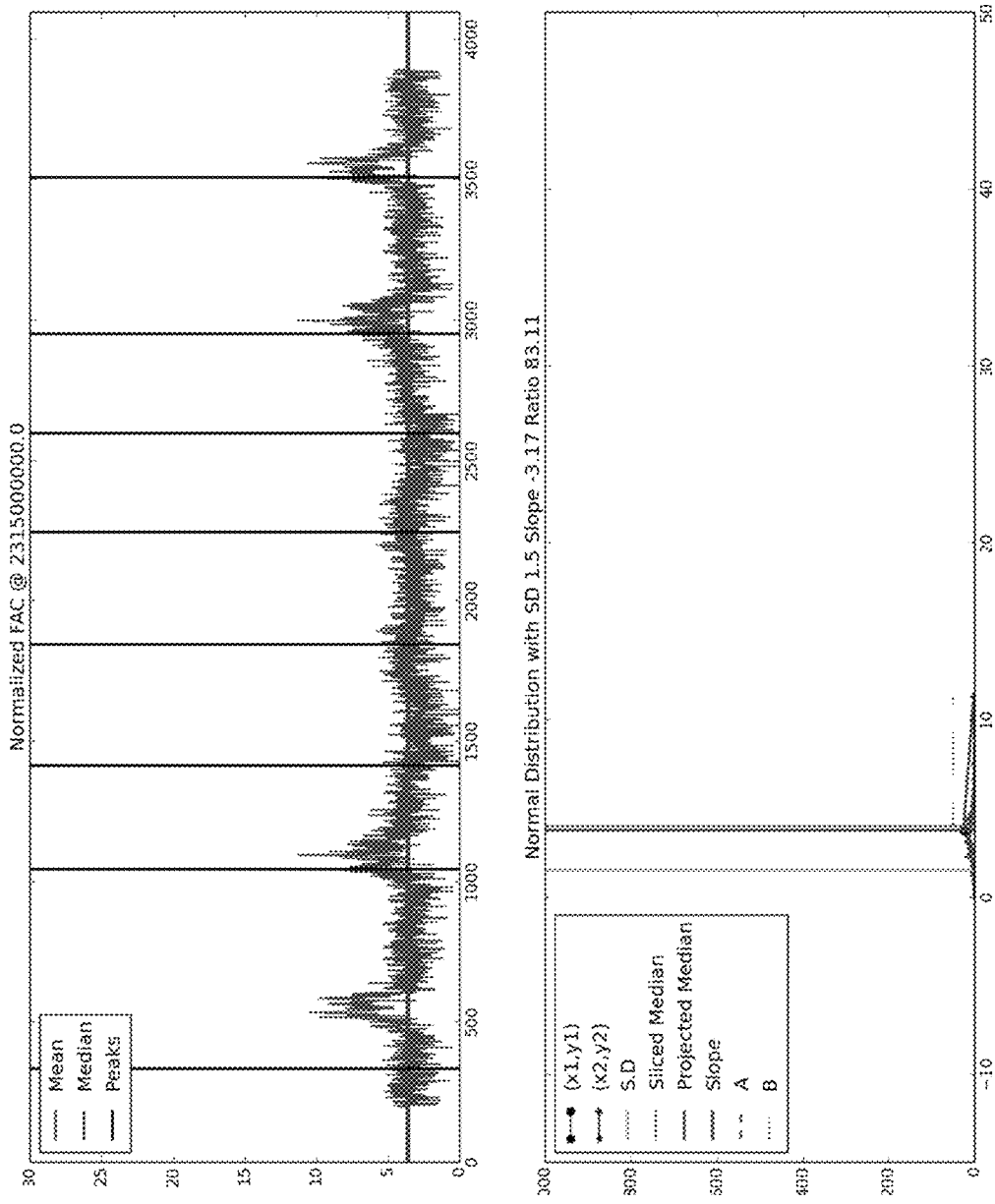
FIG. 8 shows a graphical representation of unfiltered 4G signal according to an embodiment of the disclosure.
Figure 9:
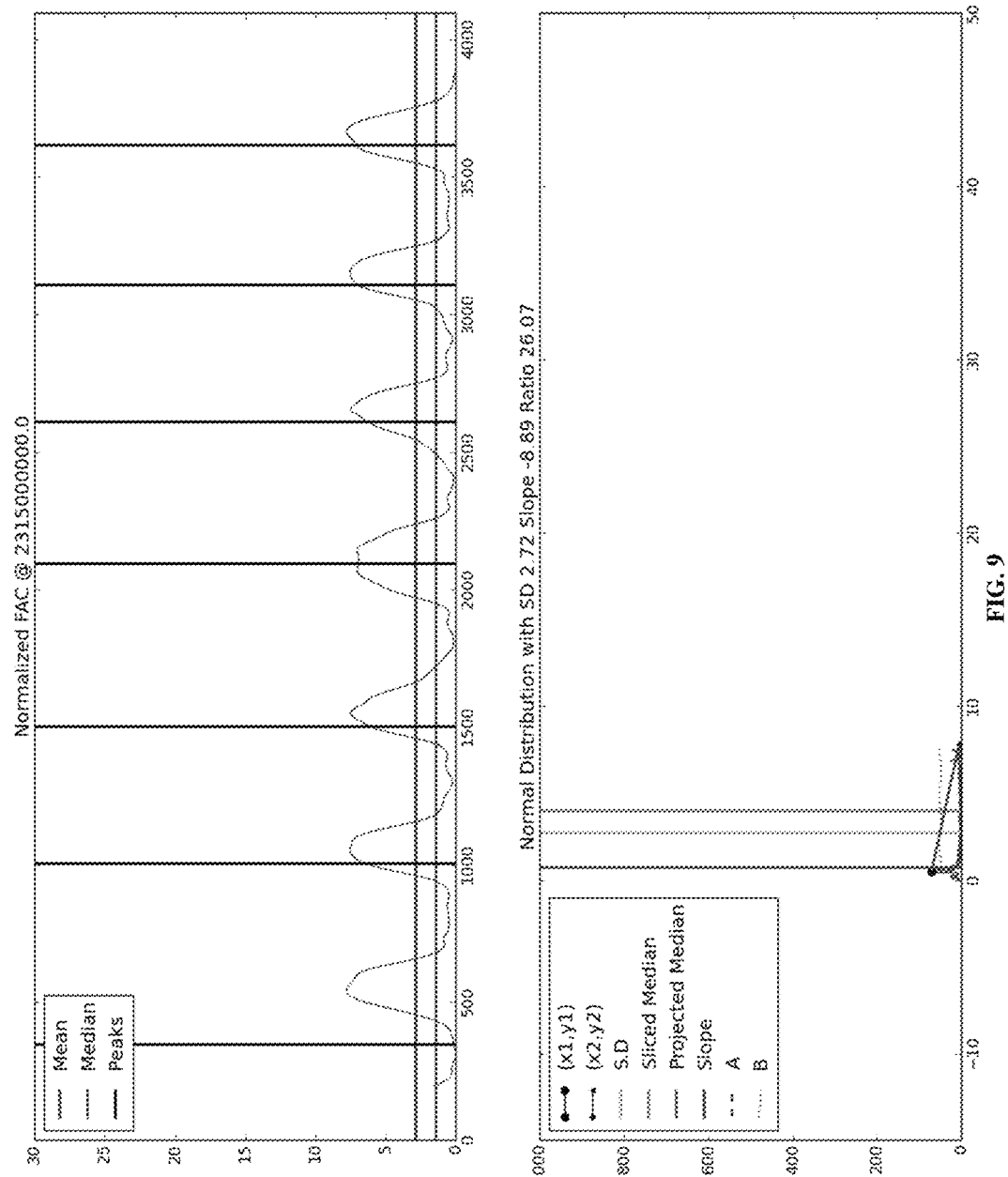
FIG. 9 shows a graphical representation of filtered 4G signal according to an embodiment of the disclosure.

Similarly, the 4G Signals at 2315.0 MHz without applying filtering is shown in FIG. 8. And after passing the 4G signal through the low pass filter is shown in FIG. 9. As shown in figures, after the low pass filtering the feature extraction becomes much easier.

Figure 10:
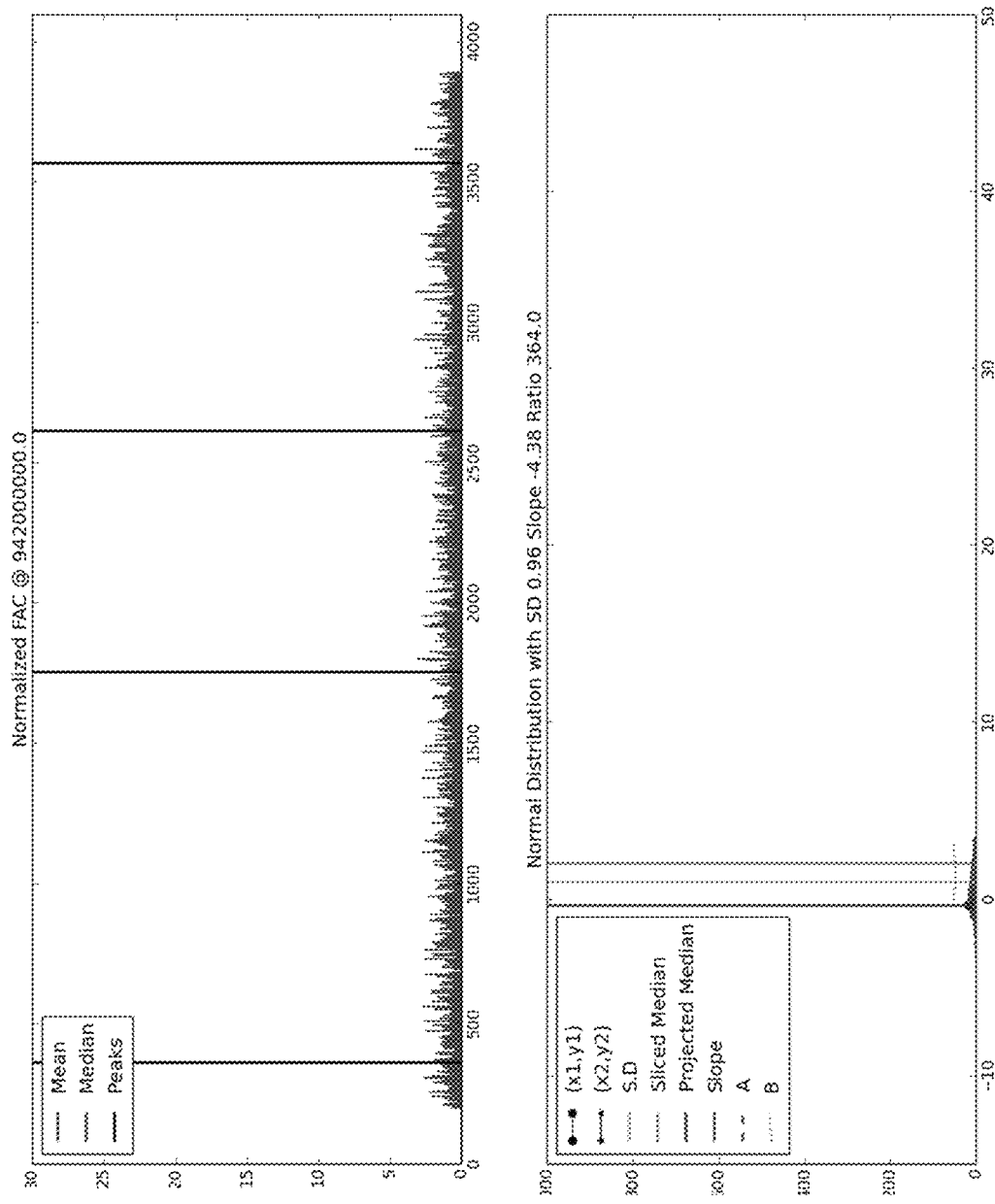
FIG. 10 shows a graphical representation of unfiltered 3G signal according to an embodiment of the disclosure.
Figure 11:
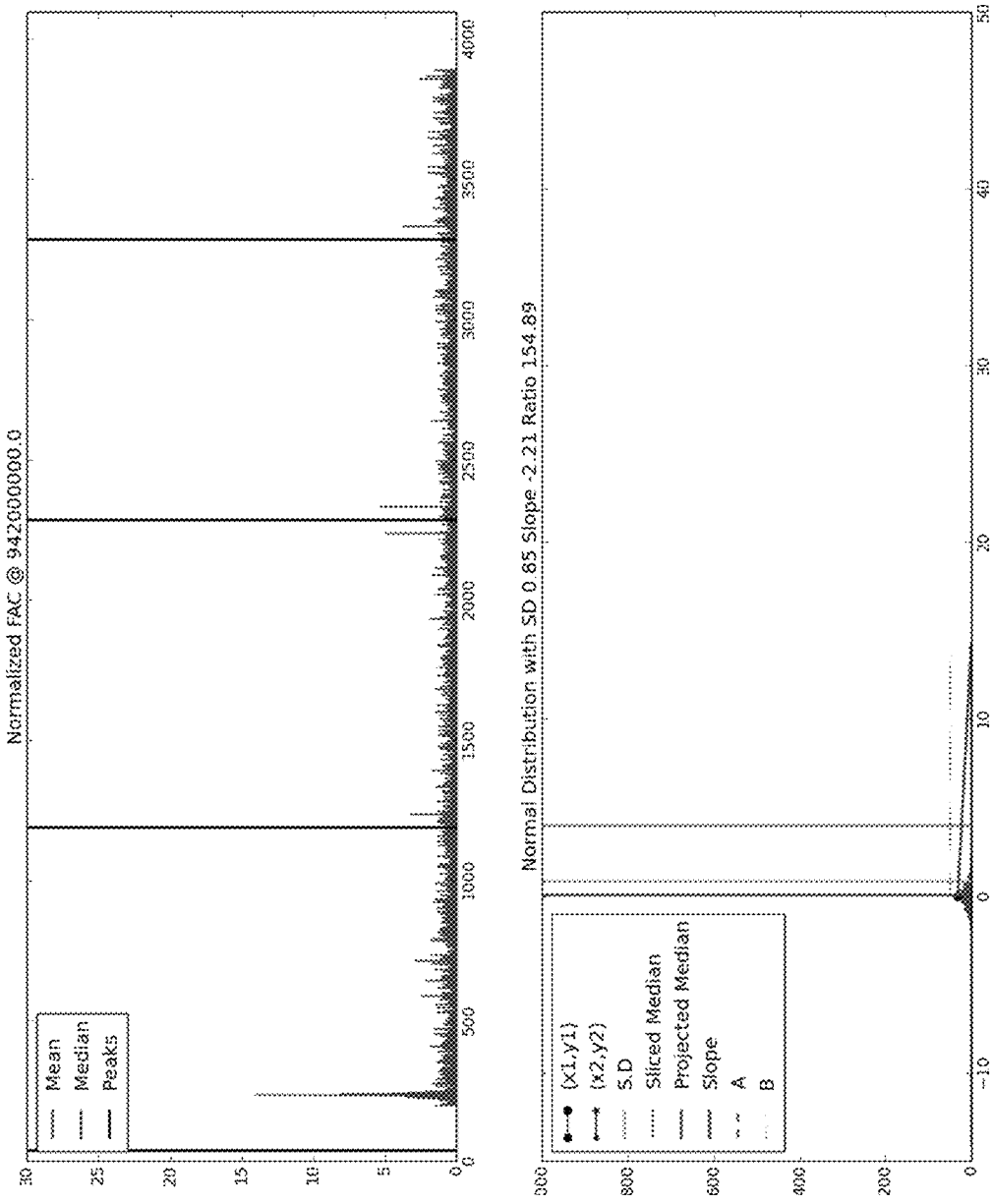
FIG. 11 shows a graphical representation of filtered 3G signal according to an embodiment of the disclosure.

Similarly, in case of 3G signals which used WCDMA modulation, displays spikes at every 10 ms. This situation is opposite in comparison to previous where low pass filter was used to remove spikes and noise. Now the focus was mainly on spikes and remove any offset signal present. Thus, high pass filter was used, which allow high frequency signals such as spikes to pass though and will block low frequency signals such as offset or dc signals. FIG. 10 shows a graph of 3G signal at 942.0 MHz without Filter and FIG. 11 shows a graph of the 3G signal after passing through the high pass filter.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein solves the problems of identifying an active RF communication in the prohibited region such as examination center. The disclosure provides a method for detecting active radiofrequency (RF) wireless communication in a region.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for detecting active radiofrequency (RF) wireless communication in a region,
   the method comprising processor one or more hardware processors implementing steps of:
   identifying one or more mobile bands present in the region, wherein each of the one or more mobile bands are present in a plurality of mobile signals coming out of a mobile tower in the region;
   dividing downlink frequencies of the one or more mobile bands among a plurality of frequency slots and further distributing among a plurality of client systems in time division domain, wherein the distributing is performed dynamically depending upon availability of the plurality of client systems by a central server;
   detecting active channels out of the one or more mobile bands based on broadcast control channel information (BCCH) transmitted by the mobile tower in the region;
   sending the BCCH information of the detected active channels back to the central server;
   calculating respective uplink channel frequency corresponding to the detected active channel from the downlink frequencies;

redistributing the detected active channels among the plurality of client systems dynamically in the time division domain;

tuning a plurality of software defined radios (SDRs) associated with the plurality of client systems to the uplink channel frequencies;

capturing a raw signal generated from the SDRs in the form of binary data;

performing a cyclic-autocorrelation on the raw signal;

filtering a cyclic-autocorrelated signal resulting from performing the cyclic-autocorrelation on the raw signal to remove a plurality of noises;

enhancing and extracting a plurality of features from the filtered cyclic-autocorrelated signal;

providing the extracted plurality of features to a support vector machine classifier to classify the presence of an active RF signal;

extracting a target device signal information if the active RF signal is detected;

and sending the target device signal information to the central server.

2. The method of claim 1, wherein the target device signal information and signal source position is calculated from the active RF signal using a triangulation method.

3. The method of claim 1 further comprising the step of determining bandwidth, uplink frequencies and operator information of the plurality of bands.

4. The method of claim 1, wherein the plurality of features include peak position, standard deviation, slope calculation and ratio calculation.

5. The method of claim 4, wherein the peak position is derived from the filtered cyclic-auto correlated signal and the standard deviation, the slope calculation and the ratio calculation, are derived from normal distribution of the filtered cyclic-auto correlated signal.

6. The method of claim 1 wherein the plurality of slots are from one or more of a 2G signal, a 3G signal, a 4G signal or a 5G signal.

7. The method of claim 1, wherein a blind signal detection method is performed using a cyclic autocorrelation.

8. The method of claim 1, wherein the plurality of client systems comprise a Launcher application, and the Launcher application is started before a start of an examination in the region.

9. One or more non-transitory machine readable information storage mediums comprising one or more instructions which when executed by one or more hardware processors cause:

identifying one or more mobile bands present in a region, wherein each of the one or more mobile bands are present in a plurality of mobile signals coming out of a mobile tower in the region;

dividing downlink frequencies of the one or more mobile bands among a plurality of frequency slots and further distributing among a plurality of client systems in time division domain, wherein the distributing is performed dynamically depending upon availability of the plurality of client systems by a central server;

detecting active channels out of the one or more mobile bands based on broadcast control channel information (BCCH) transmitted by the mobile tower in the region;

sending the BCCH information of the detected active channels back to the central server;

calculating respective uplink channel frequency corresponding to the detected active channel from the downlink frequencies;

redistributing the detected active channels among the plurality of client systems dynamically in the time division domain;

tuning a plurality of software defined radios (SDRs) associated with the plurality of client systems to the uplink channel frequencies;

capturing a raw signal generated from the SDRs in the form of binary data;

performing a cyclic-autocorrelation on the raw signal;

filtering a cyclic-auto correlated signal resulting from performing the cyclic-autocorrelation on the raw signal to remove a plurality of noises;

enhancing and extracting a plurality of features from the filtered cyclic-autocorrelated signal;

providing the extracted plurality of features to a support vector machine classifier to classify the presence of an active RF signal;

extracting a target device signal information if the active RF signal is detected;

and sending the target device signal information to the central server.

10. The one or more non-transitory machine readable information storage mediums of claim 9, wherein the target device signal information and signal source position is calculated from the active RF signal using a triangulation method.

11. The one or more non-transitory machine readable information storage mediums of claim 9, further comprising the step of determining bandwidth, uplink frequencies and operator information of the plurality of bands.

12. The one or more non-transitory machine readable information storage mediums of claim 9, wherein the plurality of features include peak position, standard deviation, slope calculation and ratio calculation.

13. The one or more non-transitory machine readable information storage mediums of claim 12, wherein the peak position is derived from the filtered cyclic-auto correlated signal and the standard deviation, the slope calculation and the ratio calculation, are derived from normal distribution of the filtered cyclic-auto correlated signal.

14. The one or more non-transitory machine readable information storage mediums of claim 9, wherein the plurality of slots are from one or more of a 2G signal, a 3G signal, a 4G signal or a 5G signal.

15. The one or more non-transitory machine readable information storage mediums of claim 9, wherein a blind signal detection method is performed using a cyclic autocorrelation.

16. The one or more non-transitory machine readable information storage mediums of claim 9, wherein the plurality of client systems comprise a Launcher application, and the Launcher application is started before a start of an examination in the region.

* * * * *